United States Patent
Ito et al.

(10) Patent No.: US 11,255,427 B2
(45) Date of Patent: Feb. 22, 2022

(54) SHIFT DEVICE

(71) Applicants: KABUSHIKI KAISHA TOKAI-RIKA-DENKI-SEISAKUSHO, Aichi-ken (JP); SUBARU CORPORATION, Tokyo (JP)

(72) Inventors: Takumi Ito, Aichi-ken (JP); Shingo Nagashima, Aichi-ken (JP); Yusaku Imai, Aichi-ken (JP); Masahide Mita, Tokyo (JP); Tomoyuki Otsuka, Tokyo (JP)

(73) Assignees: KABUSHIKI KAISHA TOKAI-RIKA-DENKI-SEISAKUSHO, Aichi (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/857,811

(22) Filed: Apr. 24, 2020

(65) Prior Publication Data
US 2020/0355259 A1  Nov. 12, 2020

(30) Foreign Application Priority Data
May 7, 2019  (JP) .............................. JP2019-087594

(51) Int. Cl.
| | | |
|---|---|---|
| B60K 20/00 | (2006.01) | |
| F16H 59/04 | (2006.01) | |
| F16H 59/10 | (2006.01) | |
| B60K 20/04 | (2006.01) | |
| F16H 59/02 | (2006.01) | |
| G05G 25/04 | (2006.01) | |

(52) U.S. Cl.
CPC ............. *F16H 59/10* (2013.01); *B60K 20/04* (2013.01); *F16H 59/0213* (2013.01); *G05G 25/04* (2013.01)

(58) Field of Classification Search
CPC ...... F16H 59/0213; F16H 59/08; F16H 59/10; B60K 20/02; B60K 20/04; G05G 25/04
See application file for complete search history.

(56) References Cited

U.S. PATENT DOCUMENTS 2,753,008 A * 7/1956 Peirce .................... G05G 25/04
  180/90.6
3,748,923 A * 7/1973 Babbitt, Jr. ............ G05G 25/04
  74/566

(Continued)

FOREIGN PATENT DOCUMENTS

JP  2007-230252 A  9/2007

*Primary Examiner* — Adam D Rogers
(74) *Attorney, Agent, or Firm* — Roberts Calderon Safran & Cole P.C.

(57) ABSTRACT

A shift device in which a press-fit column of a control lever is press-fitted into and passed through a press-fit hole in a boot such that the boot forms a seal between the upper side and the lower side of the press-fit hole. A press-fit interference amount between the press-fit column and the press-fit hole is larger at a length direction intermediate side of the press-fit hole than at a length direction end portion side of the press-fit hole. This enables a reduction in the contact force between the press-fit column and a peripheral face of the press-fit hole at the length direction intermediate side of the press-fit hole to be suppressed, enabling the sealing performance of the press-fit hole in the boot to be improved.

6 Claims, 5 Drawing Sheets

(56) References Cited

U.S. PATENT DOCUMENTS

| | | | | |
|---|---|---|---|---|
| 4,581,951 A | * | 4/1986 | Watson | F16H 59/042 |
| | | | | 74/473.3 |
| 4,991,457 A | * | 2/1991 | Chen | F16H 59/0213 |
| | | | | 277/640 |

\* cited by examiner

SHIFT DEVICE

CROSS-REFERENCE TO RELATED APPLICATION

This application is based on and claims priority under 35 USC 119 from Japanese Patent Application No. 2019-087594 filed on May 7, 2019, the disclosure of which is incorporated by reference herein.

BACKGROUND

Technical Field

The present invention relates to a shift device in which a shift body is operated to change a shift position.

Related Art

In a shift lever device disclosed in Japanese Patent Application Laid-Open (JP-A) No. 2007-230252, a shift lever (arm) is press-fitted into and passed through a rectangular hole in an elastic boot body, and the rectangular hole pivots when the shift lever is pivoted. The elastic boot body forms a seal between the upper and lower sides of the rectangular hole.

Note that improved sealing performance of the rectangular hole in the elastic boot body is desirable in shift lever devices such as that described above.

SUMMARY

In consideration of the above circumstances, an object of the present invention is to obtain a shift device capable of improving the sealing performance of a press-fit hole in a sealing body.

A shift device of a first aspect of the present invention includes a shift body that is movable to change a shift position, and a sealing body including a press-fit hole that the shift body is press-fitted into and passed through, with a press-fit interference amount between the shift body and the press-fit hole being larger at a length direction intermediate side of the press-fit hole than at a length direction end portion side of the press-fit hole, the press-fit hole being configured to move when the shift body is moved, and the sealing body being configured to form a seal between one side and another side of the press-fit hole.

In the shift device of the first aspect of the present invention, the shift body is movable to change the shift position. The shift body is press-fitted into and passed through the press-fit hole of the sealing body, and the press-fit hole is moved when the shift body is moved. The sealing body forms a seal between the one side and the other side of the press-fit hole.

The press-fit interference amount between the shift body and the press-fit hole is larger at the length direction intermediate side of the press-fit hole than at the length direction end portion side of the press-fit hole. This enables a reduction in the contact force between the shift body and a peripheral face of the press-fit hole at the length direction intermediate side of the press-fit hole to be suppressed, enabling the sealing performance of the press-fit hole of the sealing body to be improved.

A shift device of a second aspect of the present invention is the shift device of the first aspect of the present invention, wherein the press-fit interference amount between the shift body and the press-fit hole gradually increases on progression from the length direction end portion side toward the length direction intermediate side of the press-fit hole.

In the shift device of the second aspect of the present invention, the press-fit interference amount between the shift body and the press-fit hole gradually increases on progression from the length direction end portion side toward the length direction intermediate side of the press-fit hole. This enables a reduction in the contact force between the shift body and a peripheral face of the press-fit hole to be suppressed from the length direction end portion side to the length direction intermediate side of the press-fit hole, enabling the sealing performance of the press-fit hole of the sealing body to be effectively improved.

A shift device of a third aspect of the present invention is the shift device of the first aspect or the second aspect of the present invention, further including a catch section that is provided at the shift body and that is configured to catch on a length direction outside portion of the press-fit hole in the sealing body.

In the shift device of the third aspect of the present invention, the catch section of the shift body is configured to catch on the length direction outside portion of the press-fit hole in the sealing body. This enables the shift body to be press-fitted into and passed through the press-fit hole in a state in which the length direction outside portion of the press-fit hole in the sealing body is caught on the catch section, enabling the shift body to be easily press-fitted into and passed through the press-fit hole.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
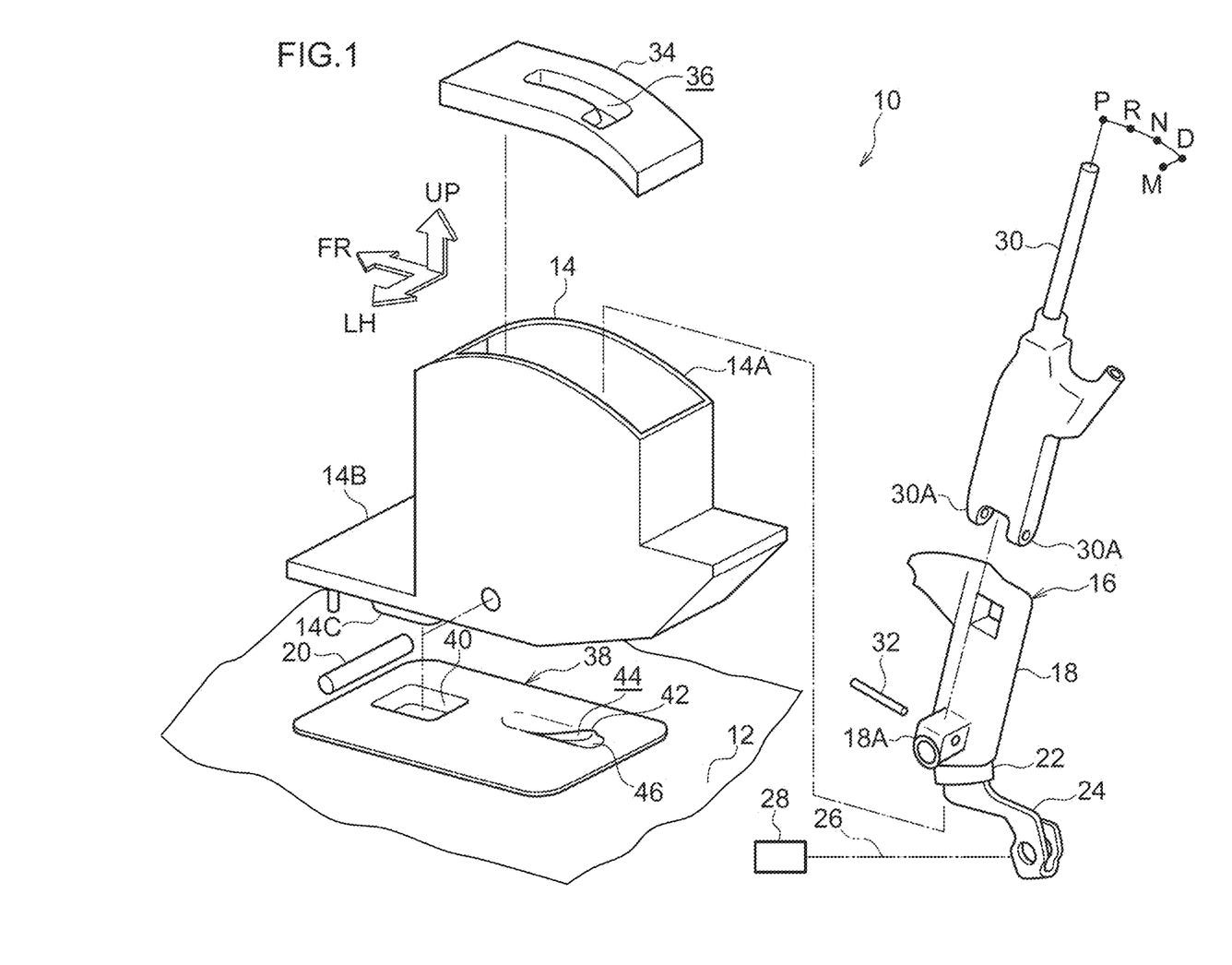
FIG. 1 is an exploded perspective view illustrating a shift device according to a first exemplary embodiment of the present invention, as viewed from the oblique rear left.

FIG. 1 is an exploded perspective view illustrating a shift device 10 according to a first exemplary embodiment of the present invention, as viewed from the oblique rear left. Note that in the drawings, the arrow FR indicates the front of the shift device 10, the arrow LH indicates the left of the shift device 10, and the arrow UP indicates the upper side of the shift device 10.

The shift device 10 according to the present exemplary embodiment illustrated in FIG. 1 is installed to a floor section 12 (a vehicle body side) of a vehicle cabin of a vehicle (automobile), and is disposed at a vehicle width direction inner side of a driving seat (not illustrated in the drawings) of the vehicle. The front, left, and upper sides of the shift device 10 respectively correspond to the front, left, and upper sides of the vehicle. A rectangular opening (not illustrated in the drawings) is formed penetrating the floor section 12 at the lower side of the shift device 10. The opening places the upper side of the floor section 12 (the vehicle cabin side) and the lower side of the floor section 12 in communication with each other.

A substantially rectangular tube shaped housing 14, serving as a housing body, is provided to the shift device 10. The housing 14 is fixed to the floor section 12. A substantially rectangular tube shaped housing tube 14A, serving as a housing section, is provided to the housing 14. The housing tube 14A is open toward the upper and lower sides. A rectangular plate shaped projecting plate 14B is integrally provided to the front side of the housing tube 14A. The projecting plate 14B projects forward from a lower end of a front wall of the housing tube 14A, and a lower face of the projecting plate 14B lies in the same plane as a lower face of the housing tube 14A. A rectangular column shaped projecting column 14C is integrally provided at the lower side of the projecting plate 14B. The projecting column 14C projects downward from a central portion of the projecting plate 14B.

A control lever 16 (see FIG. 2B), serving as a shift body, is housed inside the housing tube 14A of the housing 14. A substantially rectangular column shaped lever section 18 made of cured resin is provided at an upper portion of the control lever 16. A substantially rectangular column shaped coupling column 18A, serving as a coupling section, is integrally formed in the vicinity of a lower end portion of the lever section 18. The coupling column 18A projects toward the left. A circular column shaped first support shaft 20, serving as a support member, penetrates the lever section 18 in the vicinity of the lower end portion of the lever section 18 and penetrates the coupling column 18A at a lower portion of the coupling column 18A. The first support shaft 20 is retained by a lower end portion of a left wall and a lower end portion of a right wall of the housing tube 14A. The first support shaft 20 has an axial direction running parallel to the left-right direction, such that the control lever 16 is supported by the first support shaft 20 so as to be capable of pivoting in the front-rear direction.

Figure 2A:
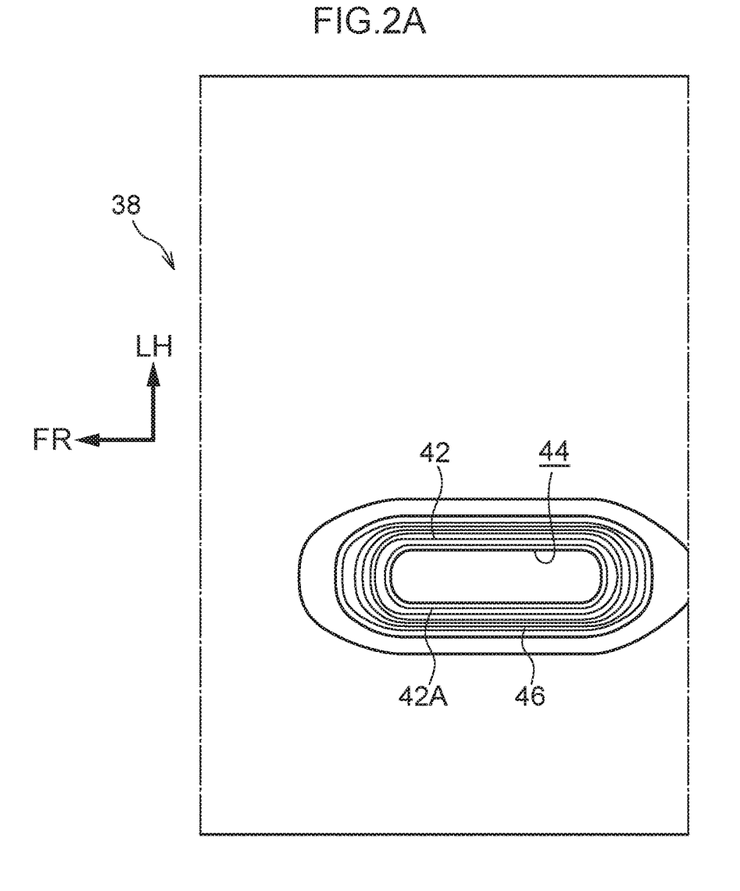
FIG. 2A is a lower face view illustrating a boot of the shift device according to the first exemplary embodiment of the present invention, as viewed from below.
Figure 2B:
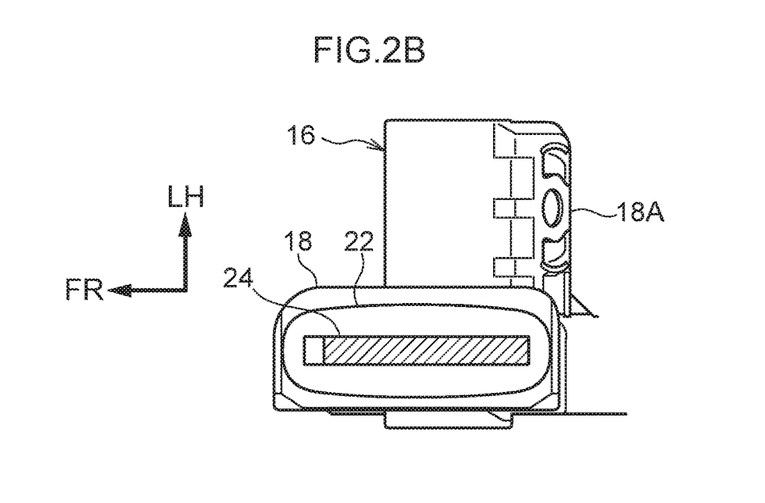
FIG. 2B is a lower face view illustrating a control lever of the shift device according to the first exemplary embodiment of the present invention, as viewed from below.

A substantially rectangular column shaped press-fit column 22, serving as a press-fit section, is formed to the lower end portion of the lever section 18. A portion of the lever section 18 above the press-fit column 22 projects toward both front-rear direction sides and both left-right direction sides with respect to the press-fit column 22. The press-fit column 22 is disposed with its width direction running parallel to the left-right direction, and the length direction and axial direction of the press-fit column 22 respectively running parallel to the front-rear direction side and the up-down direction side, both of which are perpendicular to the left-right direction. A left face and a right face of the press-fit column 22 each curve in a convex shape along the length direction (the length direction of the press-fit column 22) such that each of the left face and the right face of the press-fit column 22 is inclined in directions heading toward the corresponding left or right side on progression from both length direction ends toward the length direction center thereof. A front face and a rear face of the press-fit column 22 each curve in a convex shape along the width direction (the width direction of the press-fit column 22) such that each of the front face and the rear face of the press-fit column 22 is inclined in directions heading toward the corresponding front or rear side on progression from both width direction ends toward the width direction center thereof. The press-fit column 22 is disposed in the opening in the floor section 12.

A substantially elongated plate shaped connecting plate 24 made of metal is provided at a lower portion of the control lever 16. The connecting plate 24 extends downward from a lower face of the press-fit column 22. The connecting plate 24 is disposed at the lower side of the floor section 12 and a lower end portion of the connecting plate 24 is connected to an automatic transmission 28 (a transmission) of the vehicle via a cable 26.

A substantially rod shaped shift lever 30, serving as an operable body, is housed inside the housing tube 14A of the housing 14. A pair of coupling plates 30A are integrally provided to a lower end portion of the shift lever 30. The coupling plates 30A project downward and are respectively disposed at the front and rear sides of the coupling column 18A of the control lever 16 (lever section 18). A circular column shaped second support shaft 32, serving as a support section, penetrates the pair of coupling plates 30A and an upper portion of the coupling column 18A. The second support shaft 32 is retained by the pair of coupling plates 30A so as to support the shift lever 30, and is disposed with its axial direction running parallel to the front-rear direction side that is perpendicular to the left-right direction.

The shift lever 30 is capable of pivoting in the front-rear direction (a shift direction) as a unit with the control lever 16 through the second support shaft 32. The shift lever 30 and the control lever 16 can be disposed in a P position (parking position), an R position (reverse position), an N position (neutral position), and a D position (drive position), serving as shift positions located in the above sequence on progression from front to rear. The shift lever 30 is also capable of pivoting in the left-right direction (a select direction) about the second support shaft 32 with respect to the control lever 16. The shift lever 30 can thereby be pivoted from the D position toward the left so as to be disposed in an M position (manual position), serving as a shift position. When the shift position of the control lever 16 has been changed, the automatic transmission 28 is operated via the cable 26 such that a shift range of the automatic transmission 28 is changed to a shift range corresponding to the shift position of the control lever 16.

A substantially rectangular plate shaped gate plate 34, serving as a guiding body, is fixed to the upper side of the housing tube 14A of the housing 14. The gate plate 34 closes off the upper side of the inside of the housing tube 14A. A gate groove 36, serving as a guiding section, is formed penetrating the gate plate 34. An upper portion of the shift lever 30 passes through the gate groove 36. The shift lever 30 is thereby guided by the gate groove 36 when pivoted to change the shift position of the shift lever 30. The upper portion of the shift lever 30 extends into the vehicle cabin, and the upper portion of the shift lever 30 is pivot-operated by an occupant (in particular the driver) of the vehicle.

A substantially rectangular plate shaped boot 38 is provided at the lower side of the housing 14. The boot 38 is made of rubber, and has elastic, sealing, and soundproofing properties. The entire periphery of the boot 38 is sandwiched between an outer portion of the opening in the floor section 12 and a lower face of the housing 14, such that the boot 38 forms a seal between the outer portion of the opening in the floor section 12 and the lower face of the housing 14. A rectangular tube shaped sealing tube 40 is integrally formed to a front side portion of the boot 38. The inside of the sealing tube 40 is open toward the upper and lower sides. The projecting column 14C of the housing 14 is press-fitted into the sealing tube 40, such that elastic force of the sealing tube 40 places the entire periphery of the sealing tube 40 and the entire periphery of the projecting column 14C in close contact with each other. The boot 38 thus forms a seal between the upper and lower sides of the inside of the sealing tube 40.

Figure 4A:
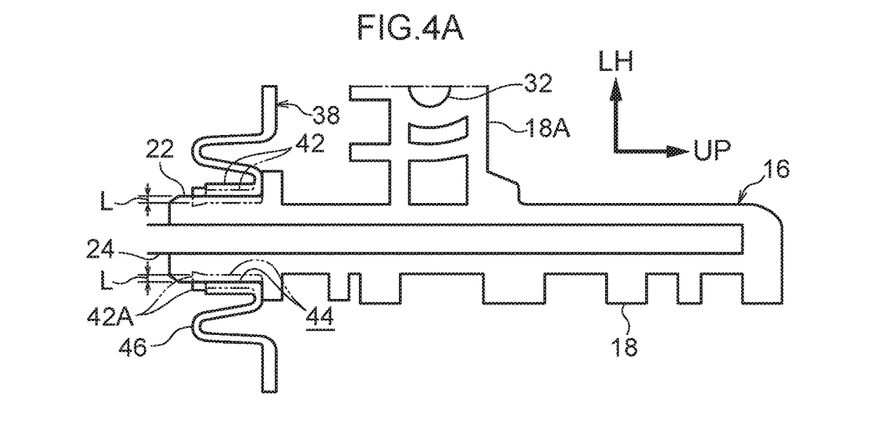
FIG. 4A is a cross-section (sectioned along line A-A in FIG. 3) illustrating relevant portions of the shift device of the first exemplary embodiment of the present invention, as viewed from the rear.
Figure 4B:
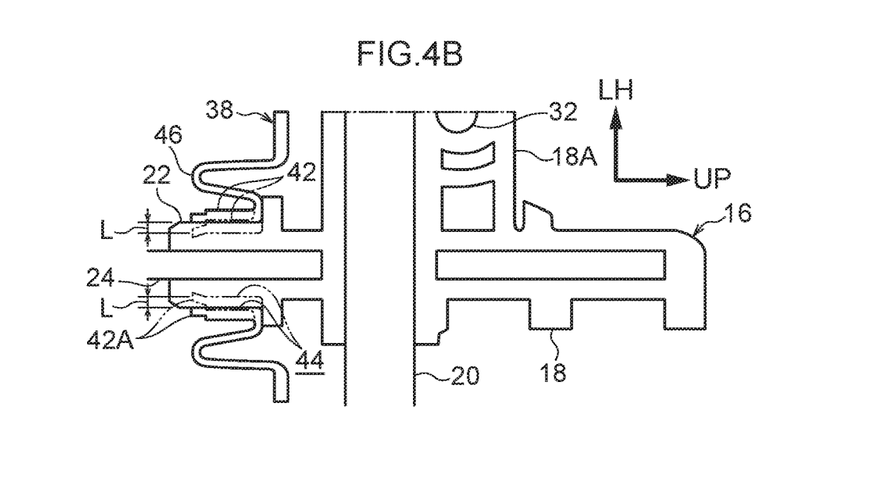
FIG. 4B is a cross-section (sectioned along line B-B in FIG. 3) illustrating relevant portions of the shift device of the first exemplary embodiment of the present invention, as viewed from the rear.
Figure 4C:
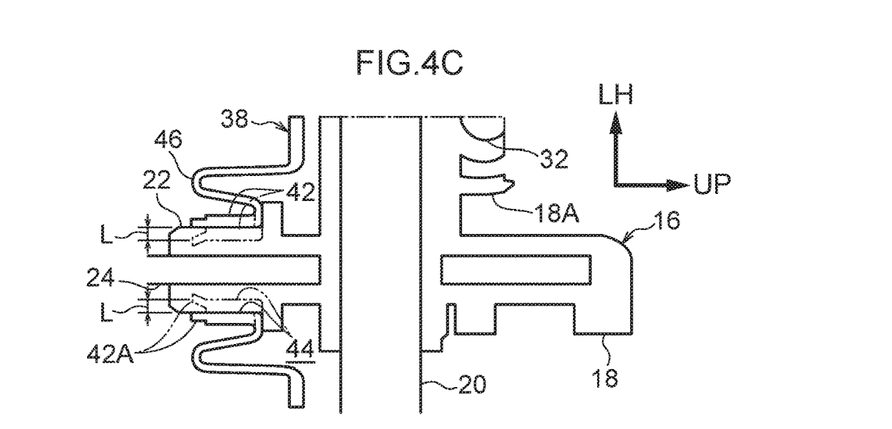
FIG. 4C is a cross-section (sectioned along line C-C in FIG. 3) illustrating relevant portions of the shift device of the first exemplary embodiment of the present invention, as viewed from the rear.

A substantially rectangular tube shaped press-fit tube 42 (see FIG. 2A and the double-dotted dashed lines in FIG. 4A to FIG. 4C) is integrally formed to a rear portion of the boot 38. The inside of the press-fit tube 42 configures a press-fit hole 44. The press-fit hole 44 is open toward the upper and lower sides. A substantially rectangular tube shaped lip portion 42A is formed to a radial direction inside portion of a lower end portion of the press-fit tube 42. The lip portion 42A is disposed coaxially to the press-fit tube 42. The lip portion 42A extends in a direction toward the radial direction inside on progression downward, and an inner peripheral face of the lip portion 42A is contiguous to an inner peripheral face of the press-fit tube 42 at the upper side of the lip portion 42A.

The press-fit tube 42 (press-fit hole 44) is disposed with its width direction running parallel to the left-right direction, and the length direction and axial direction of the press-fit tube 42 (press-fit hole 44) respectively running parallel to the front-rear direction side and the up-down direction side, both of which are perpendicular to the left-right direction. A left wall and a right wall of the press-fit tube 42 are disposed running parallel to the length direction (the length direction of the press-fit tube 42), such that a left face and a right face of the press-fit hole 44 are disposed running parallel to the length direction (the length direction of the press-fit tube 42). A front wall and a rear wall of the press-fit tube 42 (a front face and a rear face of the press-fit hole 44) each curve in a convex shape along the width direction (the width direction of the press-fit tube 42), such that each of the front wall and the front wall of the press-fit tube 42 (the front face and the rear face of the press-fit hole 44) are inclined in directions heading toward the corresponding front or rear side on progression from both width direction ends toward the width direction center.

Figure 3:
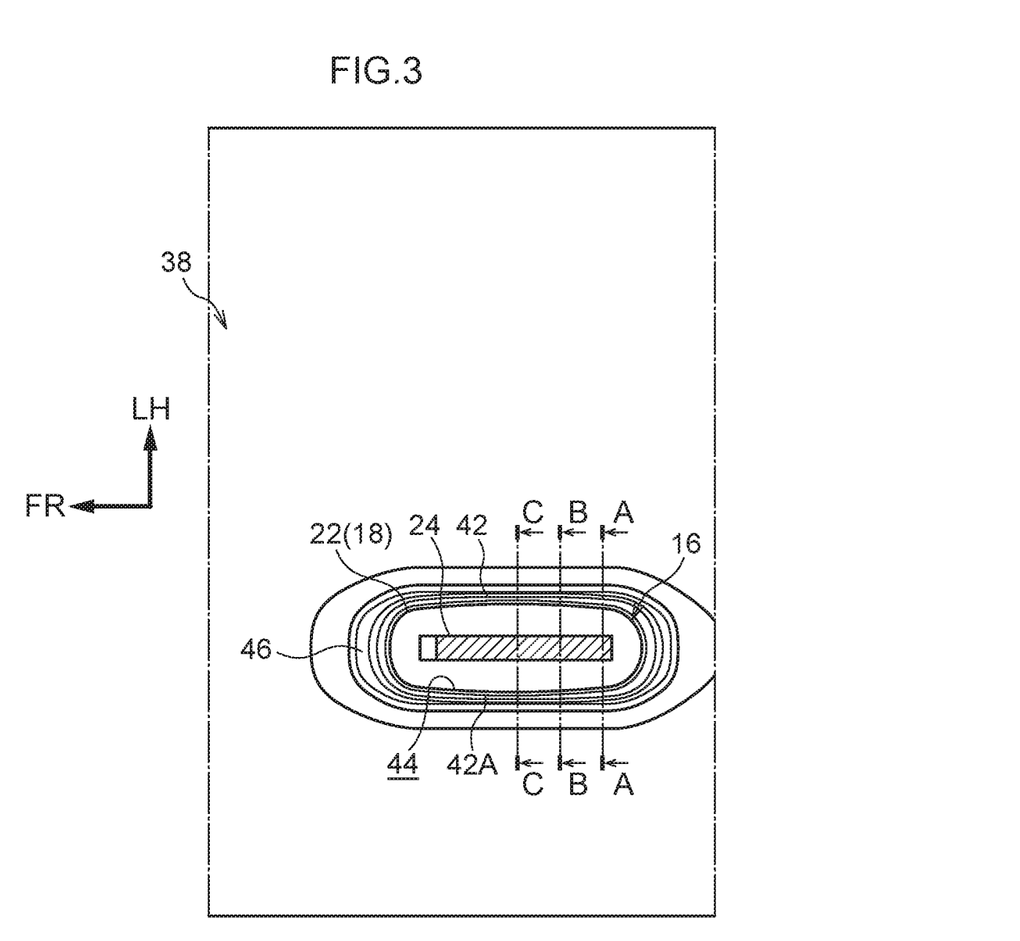
FIG. 3 is a lower face view illustrating relevant portions of the shift device according to the first exemplary embodiment of the present invention, as viewed from below.

The press-fit column 22 of the control lever 16 is press-fitted into and passed through the press-fit tube 42 (press-fit hole 44) (see FIG. 3 and the solid lines in FIG. 4A to FIG. 4C), such that the width direction, length direction and axial direction of the press-fit tube 42 (press-fit hole 44) respectively run parallel to the width direction, length direction, and axial direction of the press-fit column 22. The entire periphery of the press-fit tube 42 (the entire peripheral face of the press-fit hole 44) and the entire periphery of the press-fit column 22 are placed in close contact with each other by the elastic force of the press-fit tube 42, such that the boot 38 forms a seal between the upper side (one side) and the lower side (another side) of the press-fit hole 44. The boot 38 is also placed in close contact with the entire periphery of the lower face of the housing tube 14A of the housing 14 by elastic force, such that the boot 38 forms a seal between the inside of the housing tube 14A and the opening in the floor section 12.

A deformable tube 46 (see FIG. 3 and FIG. 4A to FIG. 4C) with a substantially V-shaped cross-section, serving as a deformable section, is formed around the entire periphery of the press-fit tube 42 of the boot 38 at a radial direction outside of the press-fit tube 42. The deformable tube 46 projects downward. When the control lever 16 is pivoted in the front-rear direction, the press-fit tube 42 (press-fit hole 44) is pivoted in the front-rear direction as a unit with the press-fit column 22 of the control lever 16 while the deformable tube 46 undergoes elastic deformation.

Explanation follows regarding operation of the present exemplary embodiment.

In the shift device 10 with the above configuration, the press-fit column 22 of the control lever 16 is press-fitted into and passed through the press-fit tube 42 (press-fit hole 44) of the boot 38, such the boot 38 forms a seal between the upper and lower sides of the press-fit hole 44, and the boot 38 also forms a seal between the inside of the housing tube 14A of the housing 14 and the opening in the floor section 12. This restricts ingress of liquid (such as water) from the lower side of the floor section 12 into the housing tube 14A through the opening in the floor section 12.

Note that the left face and the right face of the press-fit column 22 of the control lever 16 each curve in a convex shape along the length direction, and the left face and the right face of the press-fit hole 44 in the boot 38 are disposed running parallel to the length direction. Thus, a press-fit interference amount between the press-fit hole 44 and the press-fit column 22 (a dimension by which a peripheral face of the press-fit hole 44 is displaced when the press-fit column 22 is press-fitted into the press-fit hole 44, illustrated as a press-fit interference amount L in the width direction of the press-fit hole 44 at a portion of the press-fit tube 42 at the upper side of the lip portion 42A in FIG. 4A to FIG. 4C) is greater at a length direction intermediate side of the press-fit hole 44 than at the length direction end portion sides of the press-fit hole 44. This enables a reduction in the contact force between the press-fit column 22 and the peripheral face of the press-fit hole 44 at the length direction intermediate side of the press-fit hole 44 to be suppressed, enabling the sealing performance of the press-fit hole 44 of the boot 38 to be improved.

Furthermore, the left face and the right face of the press-fit column 22 are each inclined in a direction toward the corresponding left or right side on progression from both length direction ends toward the length direction center, such that an interference amount when the press-fit column 22 is press-fitted into the press-fit hole 44 gradually increases on progression from both length direction ends toward the length direction center of the press-fit hole 44. This enables a reduction in the contact force between the press-fit column 22 and the peripheral face of the press-fit hole 44 to be suppressed from both length direction ends to the length direction center of the press-fit hole 44 (over the entire length direction), enabling the sealing performance of the press-fit hole 44 of the boot 38 to be effectively improved.

Second Exemplary Embodiment

Figure 5A:
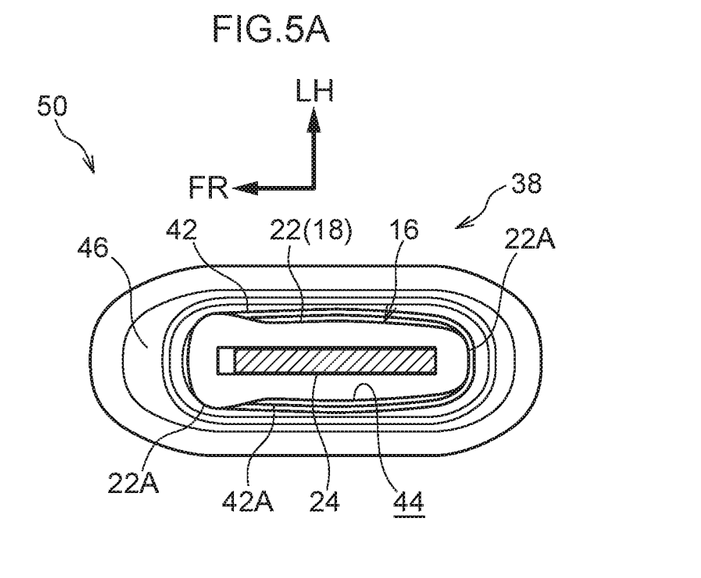
FIG. 5A is a lower face view illustrating relevant portions of a shift device according to a second exemplary embodiment of the present invention, as viewed from below.
Figure 5B:
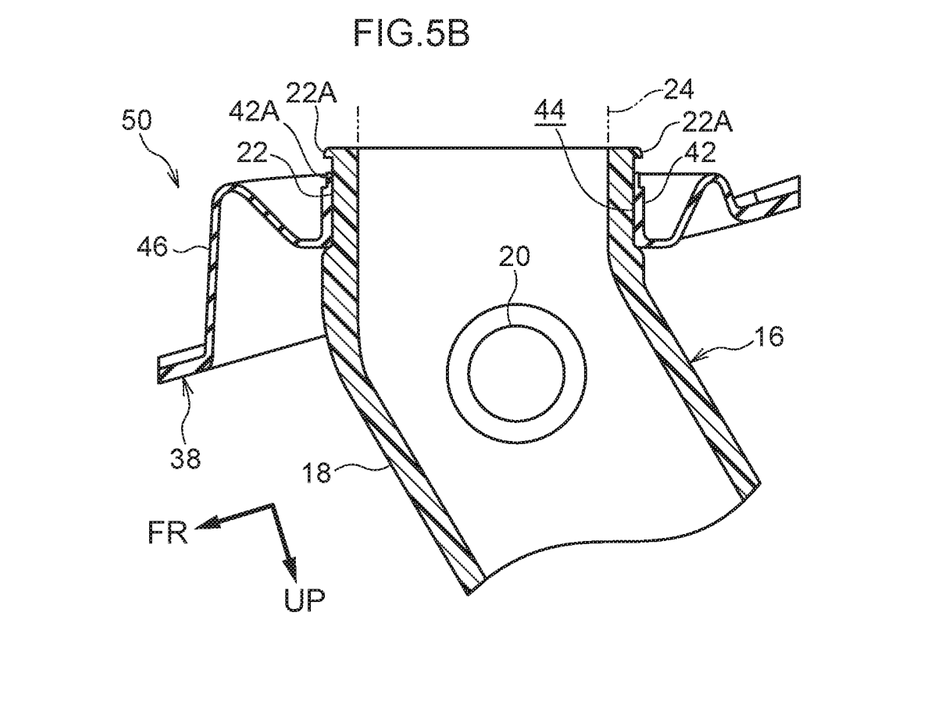
FIG. 5B is a cross-section illustrating relevant portions of the shift device according to the second exemplary embodiment of the present invention, as viewed from the right.

FIG. 5A is a lower face view illustrating relevant portions of a shift device 50 according to a second exemplary embodiment of the present invention as viewed from below, and FIG. 5B is a cross-section illustrating relevant portions of the shift device 50 as viewed from the right.

The shift device 50 according to the present exemplary embodiment has basically the same configuration as the first exemplary embodiment, but differs in the following respects.

As illustrated in FIG. 5A and FIG. 5B, in the shift device 50 according to the present exemplary embodiment, substantially U-shaped plate shaped ribs 22A serving as catch sections are integrally formed to lower ends of both the front face and the rear face of the press-fit column 22 of the control lever 16. The ribs 22A project toward the outer side of a peripheral face of the press-fit column 22. Front and rear peripheral faces (end faces) of each of the ribs 22A extend in the width direction (left-right direction) of the press-fit column 22, and a lower corner on the projecting side of each of the ribs 22A curves in a convex shape along the axial direction of the press-fit column 22. A left-right direction dimension of the front rib 22A is greater than a left-right direction dimension of the rear rib 22A, and left and right peripheral faces of each of the ribs 22A are smoothly connected to the front or rear peripheral face of the corresponding rib 22A and to the left face and the right faces of the press-fit column 22.

Note that the present exemplary embodiment is capable of exhibiting similar operation and advantageous effects to those of the first exemplary embodiment.

Moreover, when the control lever 16 is being assembled to the boot 38, after the connecting plate 24 of the control lever 16 has passed through the inside of the press-fit tube 42 (press-fit hole 44) of the boot 38 from the upper side, the press-fit column 22 of the control lever 16 is press-fitted into and passed through the press-fit tube 42.

When the press-fit column 22 of the control lever 16 is press-fitted into and passed through the press-fit tube 42, the press-fit column 22 is press-fitted into and passed through the press-fit tube 42 in a state in which the front wall or the rear wall of the press-fit tube 42 is caught on the upper side of the corresponding front or rear rib 22A of the press-fit column 22. Thus, even in cases in which the left face and the right face of the press-fit column 22 are each curved in a convex shape along the length direction, the press-fit column 22 can easily be press-fitted into and passed through the press-fit tube 42, enabling the control lever 16 to be easily assembled to the boot 38.

Note that the left-right direction dimension of the front rib 22A is larger than the left-right direction dimension of the rear rib 22A in the present exemplary embodiment. However, the left-right direction dimension of the front rib 22A and the left-right direction dimension of the rear rib 22A may be set to be the same as each other.

Furthermore, the pair of ribs 22A are provided to the press-fit column 22 in the present exemplary embodiment. However, configuration may be such that only one rib 22A is provided to the press-fit column 22.

In the first exemplary embodiment and the second exemplary embodiment, the left face and the right face of the press-fit column 22 are each inclined in a direction toward the corresponding left or right side on progression from both length direction ends toward the length direction center. However, configuration may be such that the left face and the right face of the press-fit column 22 are each inclined in a direction toward the corresponding left or right side on progression from both length direction ends toward a length direction intermediate side.

In the first exemplary embodiment and the second exemplary embodiment, the left face and the right face of the press-fit column 22 of the control lever 16 are each formed in a convex shape along the length direction. However, in addition thereto, or instead of this, the left face and the right face of the press-fit hole 44 in the boot 38 may be each formed in a convex shape along the length direction.

In the first exemplary embodiment and the second exemplary embodiment, the control lever 16 is capable of pivoting. However, the control lever 16 may be configured so as to be capable of sliding.

In the first exemplary embodiment and the second exemplary embodiment, the control lever 16 is press-fitted into and passed through the press-fit hole 44 in the boot 38. However, configuration may be made in which the shift lever 30 is press-fitted into and passed through the press-fit hole 44 in the boot 38.

What is claimed is:

1. A shift device comprising:
a shift body that is movable to change a shift position; and
a sealing body including a press-fit hole that the shift body is press-fitted into and passed through, with a press-fit interference amount between the shift body and the press-fit hole being larger at a length direction intermediate side of the press-fit hole than at a length direction end portion side of the press-fit hole, the press-fit hole being configured to move when the shift body is moved, and the sealing body being configured to form a seal between one side and another side of the press-fit hole.

2. The shift device of claim 1, wherein the press-fit interference amount between the shift body and the press-fit hole increases on progression from the length direction end portion side toward the length direction intermediate side of the press-fit hole.

3. The shift device of claim 1, further comprising at least one catch section that is provided at the shift body and that is configured to catch on a length direction outside portion of the press-fit hole in the shift body.

4. The shift device of claim 3, the at least one catch section is comprised of a plurality of catch sections that are provided at the shift body at both length direction sides of the press-fit hole.

5. The shift device of claim 1, wherein at least one of a peripheral face of the shift body or a peripheral face of the press-fit hole curves in a convex shape along the length direction of the press-fit hole.

6. The shift device of claim 1, wherein the press-fit interference amount between the shift body and the press-fit hole is larger at the length direction intermediate side of the press-fit hole than at the length direction end portion side of the press-fit hole, on both width direction sides of the press-fit hole.

* * * * *